April 8, 1952   C. E. BURKE   2,592,005
MACHINE FOR FORMING SOLDER BARS
Filed Feb. 21, 1948   5 Sheets-Sheet 1

INVENTOR.
Charles E. Burke
BY
Wood, Arey, Herron & Evans
ATTORNEYS

April 8, 1952     C. E. BURKE     2,592,005
MACHINE FOR FORMING SOLDER BARS
Filed Feb. 21, 1948     5 Sheets-Sheet 2

INVENTOR.
Charles E. Burke
BY
Word, Arey, Herron & Evans
ATTORNEYS

April 8, 1952            C. E. BURKE            2,592,005

MACHINE FOR FORMING SOLDER BARS

Filed Feb. 21, 1948            5 Sheets-Sheet 3

INVENTOR.
Charles E. Burke
BY
Wood, Arey, Herron & Evans
ATTORNEYS

April 8, 1952  C. E. BURKE  2,592,005
MACHINE FOR FORMING SOLDER BARS
Filed Feb. 21, 1948  5 Sheets-Sheet 4

INVENTOR.
Charles E. Burke
BY
Wood, Arey, Herron & Evans
ATTORNEYS

April 8, 1952        C. E. BURKE        2,592,005

MACHINE FOR FORMING SOLDER BARS

Filed Feb. 21, 1948        5 Sheets-Sheet 5

INVENTOR.
Charles E. Burke
BY
ATTORNEYS

Patented Apr. 8, 1952

2,592,005

UNITED STATES PATENT OFFICE 2,592,005

MACHINE FOR FORMING SOLDER BARS

Charles E. Burke, Ludlow, Ky.

Application February 21, 1948, Serial No. 9,997

5 Claims. (Cl. 29—38)

This invention relates to a machine for forming the ends of solder bars to provide means for connecting the solder bars, whereby successive solder bars may be connected together in a continuous length. More particularly, the invention relates to machines for forming bars of the general type disclosed in the patent to Charles E. Burke, No. 2,290,225, issued July 21, 1942, and entitled "Bar Solder Mold."

The solder bars as set out in the previous patent are arranged so that the respective bars may be easily connected together. In other words, the ends of the bars are provided with component attachment means. As stated in the issued patent, the scrap end of a used solder bar, under the past practice, was discarded as a remnant since it was too short to be handled without danger of burning the operator. In the patent, the next bar to be used is connetced to the scrap end by component attachment means formed integrally with the bars and the solder is utilized through the remainder of the remnant and the joint until the next bar becomes a remnant. The remnant thus formed is connected to the next succeeding bar for use in the manner described. In the earlier patent above set forth, the ends of the bar are formed in the initial process of molding the bar. The present machine is designed to mill or machine the attaching ends of the bar and is capable, therefore, of machining the ends of any solder bar to provide for use of the remnants as above defined.

Therefore, it has been the primary object of the present inventor to provide a machine which will form the ends of the bar to constitute the attachment means, the machine providing for automatic machining and production of complete bars of this type without requiring continuous attention on the part of the operator.

It has been the further object of the present inventor to provide a machine of this character in which a plurality of bars are supported and fed through the machine by means of a work support, and the bars are effectively clamped and centered for operation on each successive bar as the carrier is indexed and pauses at the machining station.

It has been a further object of the present inventor to provide an improved apparatus for successively rotating or indexing the work carrier to present each bar to the tools to form the male and female ends thereof.

It has been a further object of the present inventor to provide apparatus or means for locating and clamping the bar to be machined firmly and accurately in position in alignment with the drilling and milling tools and to provide that this mechanism, which in the present instance is air operated and electrically controlled, will be fully synchronized with the indexing mechanism.

A further object has been to provide tool operating and supporting units which are adjustably mounted for accurate alignment with the successive bars at the machining station and which includes means synchronized with the indexing for feeding the tools into the work at the proper time in the cycle of operation.

Other objects and certain advantages relate to the general construction of the machine for forming the male and female ends on each bar and to a fully automatic and synchronized apparatus whereby a high rate of production is maintained and all the bars are accurately machined for efficient attachment and alignment in the process of applying the solder. These objects and advantages will be more fully apparent from the following description of the drawings in which:

Referring to the drawings, the machine consists, broadly speaking, of a rotatable work holder or carrier 20 which is indexed to bring the bars successively to the forming tools and tool mounting and driving units 21 and 22 for acting upon the respective ends of the bar to produce the male and female ends thereof. Associated with the work carrier is an air operated clamping and centering mechanism generally indicated at 23. A main power shaft 24 is motor driven for driving and synchronizing the movements of the work carrier indexing mechanism 25 and the clamping and work locating mechanism 23. This shaft also translates the tool holding spindles into the work. The units 21 and 22 include, in each case, their own power driven mechanism for rotating the spindles.

Figures 1, 2, 3:
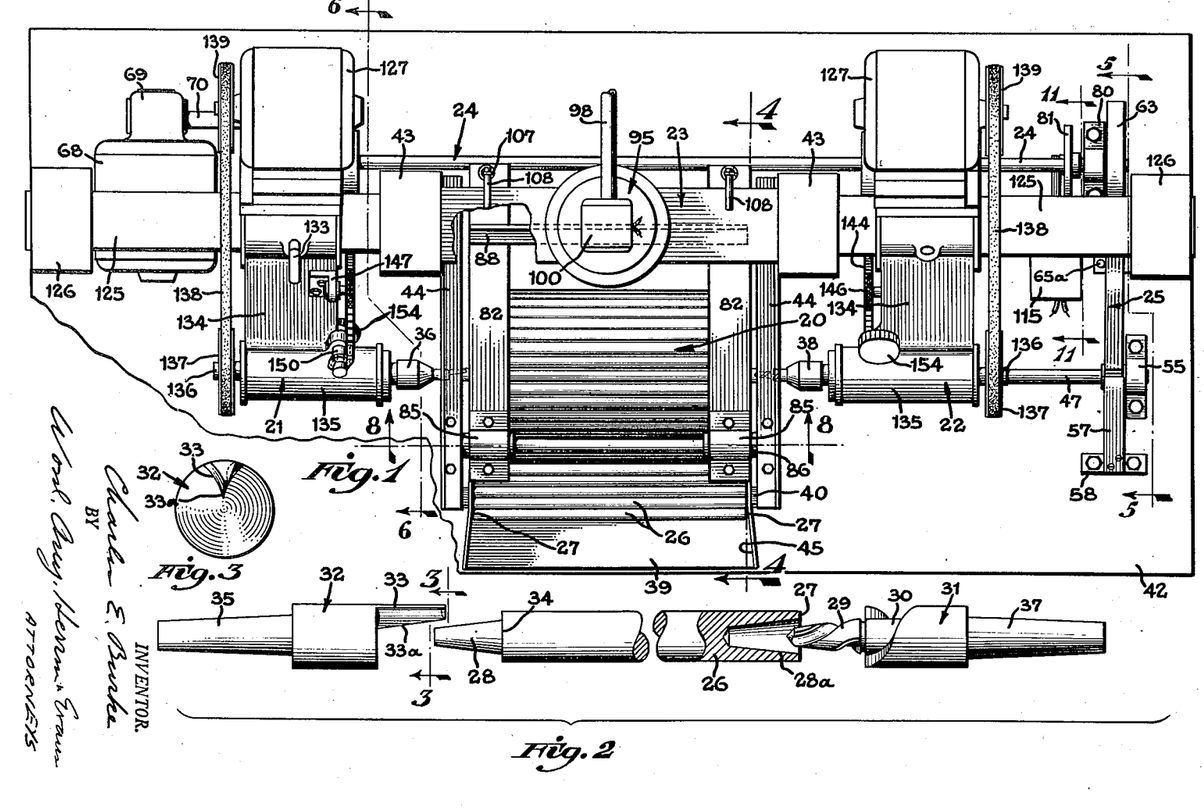
Figure 1 is a top plan view of a solder bar forming machine illustrating one embodiment of the present invention.
Figure 2 is a side view illustrating the finished solder bar and showing the tools for forming the ends thereof.
Figure 3 is a sectional view taken on line 3—3, Figure 2, illustrating, in end view, the shape of the cutter which mills off the excess material to form the male end of the bar.

One of the bars formed by the present machine is illustrated in detail in Figure 2 and is indicated at 26. These bars, in the present instance, are round but it will be appreciated that they may be of any other contour desired, such as square, hexagonal, etc. As delivered to the machine, the bars have plain ends, that is, right angle end faces 27—27 (Figure 1). The purpose of the present apparatus is to form the ends of the bar so that the bars may be secured together end to end. The formations on the bars consist of a male member or stud 28 at one end and a female portion or cavity 28a at the other end. The stud and the cavity are tapered and are component so as to interfit for securing the successive lengths of solder together.

As above stated, the purpose of this arrangement has been set out previously in the earlier patent of the present inventor, namely, Patent No. 2,290,225, issued July 21, 1942, and entitled "Bar Solder Mold." The purpose is to make it possible to use up the scrap ends of the solder bars. As the bar is substantially used up, the remnant becomes so short that the operator cannot hold it without danger of burning from the heating medium, and in the past the scraps were collected and had to be reworked into bars. In the present arrangement, the scrap end, since it either has a stud or cavity remaining, is fitted over the component end of the new bar about to be put into use. The new bar then constitutes a holding medium for the scrap end and the solder is used right through the connecting parts. It will be evident that the scrap ends are completely used up in each instance.

Thus, the purpose of the machine is to form these attaching structures at the ends of each bar and this is accomplished by means of two types of tools as shown in Figure 2. The tool for forming the cavity consists of a drill of tapered form indicated at 29. This drill has the usual shank 30 for mounting it in the holder which is generally indicated at 31.

The other tool generally indicated at 32 consists of a cutter. This cutter, as detailed in Figures 2 and 3, consists of a blade 33 projecting from the end face of the tool at one side of the center of the tool and the bar to be formed. The cutter is wedge shaped as shown in Figure 3 and includes a longitudinal cutting edge 33a extending slightly angularly relative to the axis of the cutter, the taper of this cutting edge establishing the taper of the stud to be formed on the end of the bar. In end view, the cutter portion appears segmental or pie shaped and is effective for removing the excess metal from the bar back to a shoulder 34. This edge 33a is also biased with respect to the axis so as to provide for a shearing action in removing the metal. This tool element 32 includes a shank 35 adapted to be secured in the chuck 36 which forms a part of the spindle of the particular driving unit 21. The drill holder 31 previously described also includes a shank indicated at 37, this shank being secured in the chuck 38 forming a part of the spindle in the driving unit 22.

The plain bars 26 are fed to the machine through a hopper 39. The hopper is supported on the framework of the machine. Specifically, it is mounted at an incline on an angle bar 40 secured between the uprights 41 which are secured upon the base 42 of the machine. These uprights are located or spaced apart a distance a little greater than the width of the feed hopper and their upper ends are attached to main supporting standards 43—43 toward the rear of the machine by means of horizontal angle bars 44. These parts may be secured together by welding or bolts as desired.

Figure 13:
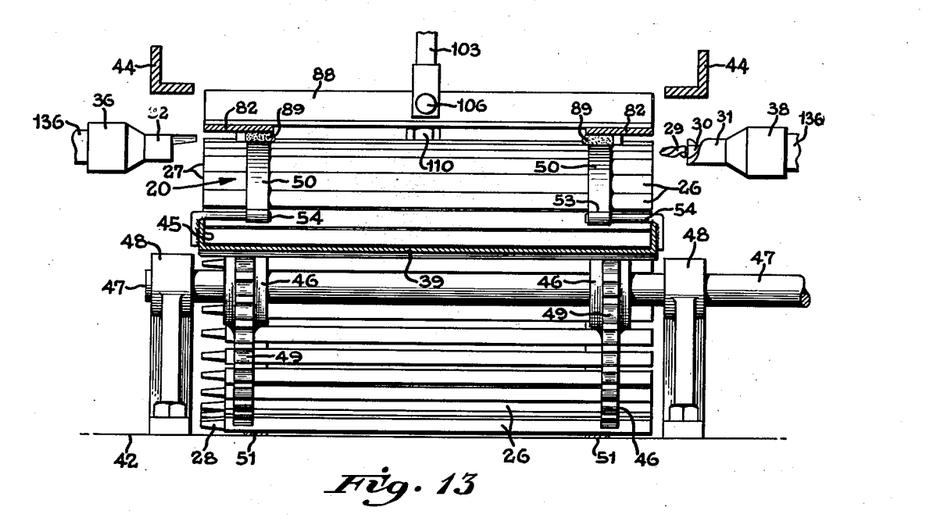
Figure 13 is a sectional view taken on line 13—13, Figure 4, detailing the carrier which feeds the solder bars successively to the machining station.
Figure 14:
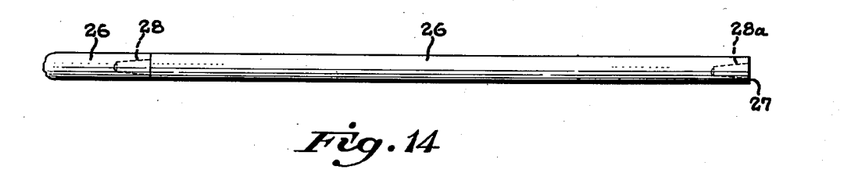
Figure 14 is a view showing two of the solder bars joined together in use, whereby the newly added bar constitutes a handle for the remnant of the previously used bar enabling full use of the remnant.

The hopper includes a flared intake end and its side flanges 45 are spaced apart for admitting and guiding the solder bars as they are fed to the work holder. The work holder or carrier (Figure 13) consists of a pair of spaced wheels or circular plates 46—46 which are notched to receive the bars. These work supporting carrier wheels are axially supported on a shaft 47 mounted in bearing brackets 48—48 adjacent the respective wheels but sufficiently spaced therefrom to permit movement of the solder bars between the same. Each wheel includes, in this instance, thirty-six circular notches 49, the notches of the respective wheels being aligned.

Figure 4:
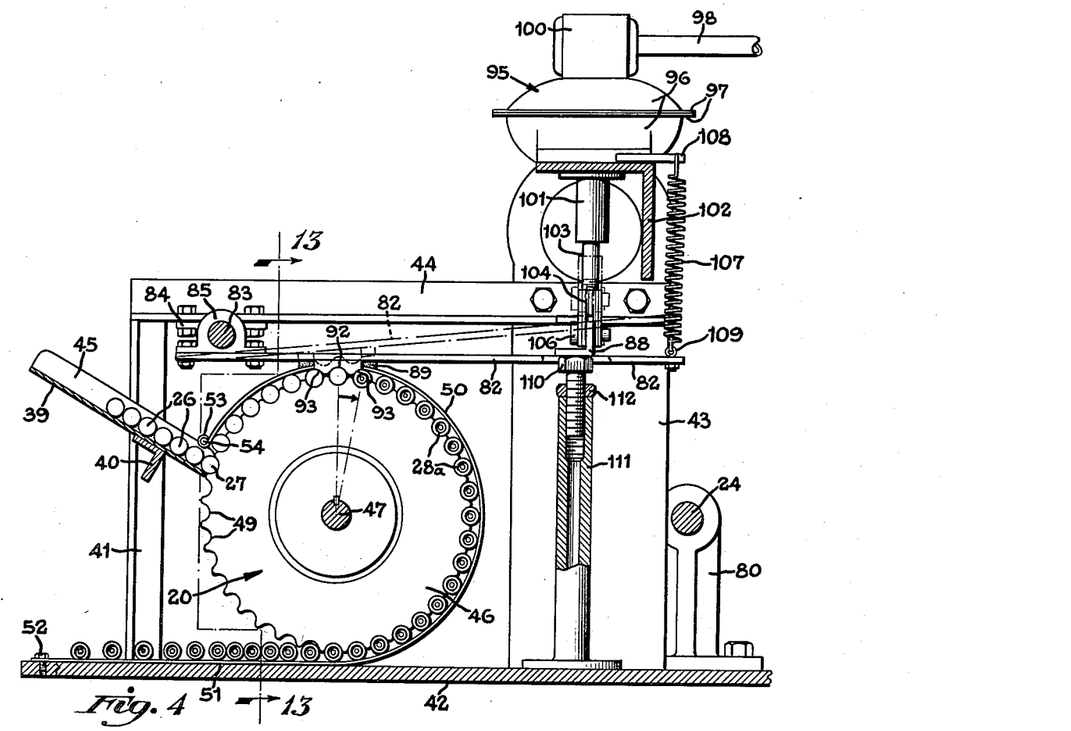
Figure 4 is a sectional view taken on line 4—4, Figure 2, illustrating the means for feeding the solder bars successively to the machine station and also illustrating the means for clamping and centering the bar being worked upon at the machining station.

The bars are successively deposited in the notches as indicated in Figure 4 and the wheels are indexed one notch at a time, the bars thus being carried to the machining station. In order to retain the bars in the notches as they move around the wheels, a circular guide strap formed from a length of steel indicated at 50 extends around each wheel from a point immediately above and adjacent the delivery point entirely around the wheel and continues in straight form as at 51 along the upper surface of the base plate of the machine (Figure 4). The carrier wheels are appropriately located with respect to the base plate to permit this arrangement of the end of the guide strap relative to the base. Thus, the finished bars successively roll away from their notches as the wheel is indexed and are delivered from the machine with the ends of the straps constituting tracks or bearing plates. The outer ends of the straps or guides are secured to the base by means of screws 52. Thus, it will be seen that the bars are loosely confined between the notches of the wheels and the straps for movement to and from the machining station. The upper ends of the straps are secured by means of loops 53 encircling pins 54 projecting inwardly from the side flanges of the delivery chute.

Figure 5:
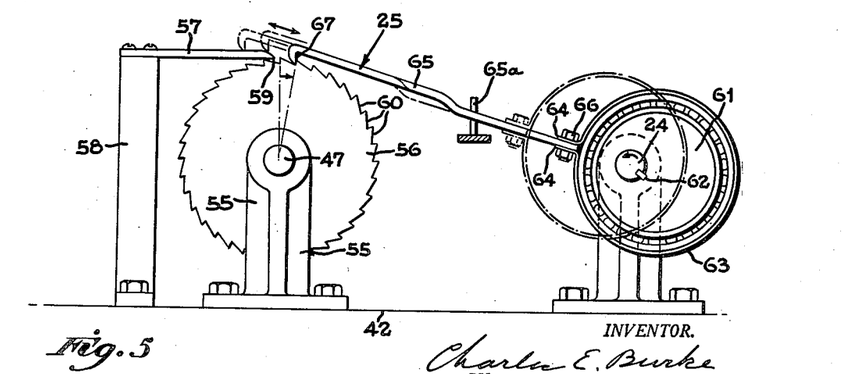
Figure 5 is a sectional view taken on line 5—5, Figure 1, illustrating the indexing mechanism for feeding the work holder to bring up successive solder bars to the machining station.

The indexing mechanism is best illustrated in Figure 5. The shaft 47 extends to one end of the machine and has its outer end additionally journalled in a bearing 55. A ratchet wheel 56 is fixed to the shaft adjacent the bearing 55. In order to prevent backward movement of the ratchet wheel and the work holding wheels and to assist in the operation of the feed hook which advances the ratchet, a pawl member 57 is mounted on the upper end of a standard 58, being disposed horizontally and having its inner end resting upon the top of the ratchet wheel. This pawl includes a sharp lower edge 59 and is under spring tension for maintaining a down pressure on the ratchet wheel and for causing its end 59 to snap in back of the respective notches or teeth 60 of the ratchet wheel.

The drive shaft 24 for the machine carries an eccentric disc 61 fixed thereto by means of a key 62. A yoke 63 encircles the eccentric 61 and is held against axial movement relative thereto. A ball bearing is provided between the yoke and the eccentric disc. The yoke includes a break or split and the ends of the yoke are spaced apart and include flanges 64. The feed bar 65 has its inner end attached between these flanges 64—64 by means of a bolt and nut 66. The outer end of this feed bar includes a hook portion 67, the downwardly turned end of which is at a proper angle to hook into and successively engage the sharp teeth 60 of the ratchet wheel.

As shown, the eccentric is effective upon each rotation of the shaft to feed the ratchet wheel one notch or a distance sufficient to bring up the next solder bar to the machining station as indicated in Figure 4. As shown in dot and dash lines, the eccentric, in its outer throw position, moves the hook end of the feed bar up over the pawl as it is guided out of engagement with the ratchet wheel. Obviously, the number of teeth on the ratchet wheel corresponds to the number of work holding grooves in the carrier wheels 46—46. A pin 65a (Figures 1 and 5) mounted on the bearing standard prevents lateral displacement of the feed bar 65 guiding the bar between the pin and the bearing standard.

Figure 12:
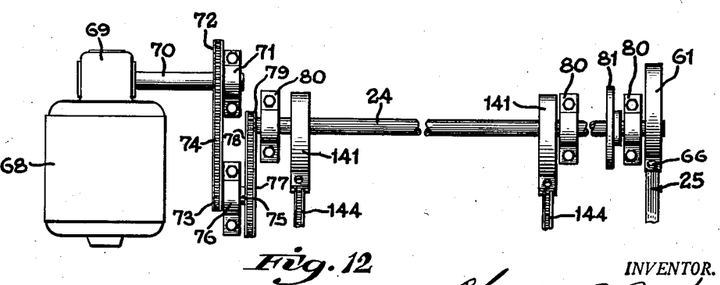
Figure 12 is a view illustrating the transmission and power means for retracting and advancing the spindles which operate upon the ends of the solder bar and for controlling the indexing of the work carrier.

As indicated in Figures 1 and 12, the shaft 24 is power driven by means of a motor 68. A gear reduction unit 69 is provided and drives a shaft 70 having its outer end journalled in the bearing bracket 71. A sprocket wheel 72 is fixed to the shaft 70 and drives a sprocket gear 73 through a chain 74. The sprocket gear 73 which is of reduced diameter for speed reduction is fixed to a stub shaft 75 journalled in a bracket 76. The other end of the shaft 75 carries a large sprocket gear 77 and this in turn through a sprocket chain 78 drives a small sprocket gear 79 fixed to the shaft 24.

The shaft 24 is journalled in bearing members 80 of which there are three appropriately located to withstand the operating thrusts on the shaft. One of these bearings is located adjacent the eccentric 61 and the others adjacent the mechanisms for translating the tool spindles relative to the work. Immediately adjacent the first named bearing member is located a cam 81 which is keyed to the shaft. This cam is effective for controlling, in the correct synchronism, the work clamping and centering means.

Figure 8:
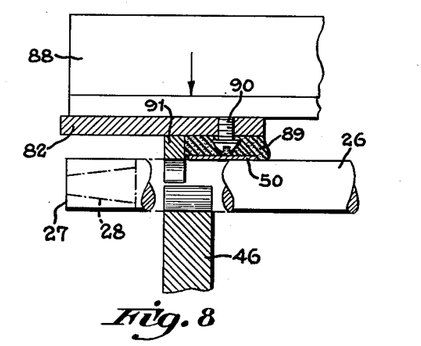
Figure 8 is an enlarged fragmmentary sectional view taken on line 8—8, Figure 1, illustrating the device for clamping and centering the successive solder bars as they are presented to the forming tool.
Figure 9:
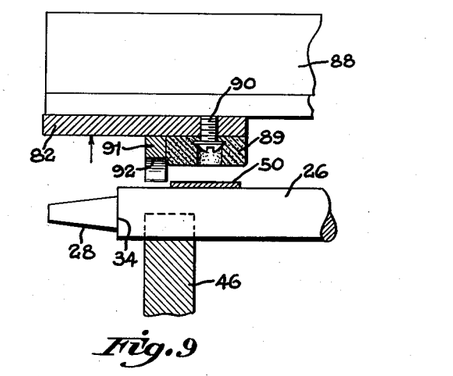
Figure 9 is a view taken similar to Figure 8 illustrating the clamping and centering means in released position.

The work centering and clamping means is best illustrated in Figures 4, 8 and 9. It is pneumatically operated and electrically controlled. The purpose of this mechanism is to firmly clamp each solder bar in position when it is disposed at the machining station and further to accurately align the successive bars with the forming tools. The structure consists of a pair of bars 82—82 pivotally mounted on a rock shaft 83. The rock shaft 83 is fixed between bearing members 84—84 secured to the undersides of the respective horizontally disposed angle members 44 previously described. Each of the bars has its forward end secured to the underside of pivot brackets 85—85 mounted upon the shaft 83. Collars 86 prevent axial displacement of the bars and hold them in the proper positions relative to the ends of the solder bars.

These bars 82—82 are connected at their rear ends by means of an angle iron cross rail 88. A pad 89 of rubber or some compressible material suitable for exerting adequate grip when compressed is secured to the undersides of the respective bars, these pads extending lengthwise of the bar and, therefore, crosswise relative to the ends of the solder bars (Figures 8 and 9). When the bars 82 are lowered or urged downwardly, the pads come in contact with the guard rail 50 and since this rail is of flexible, springy material, this contact will cause gripping or clamping of the adjacent bars in their respective grooves, particularly the central one upon which the machining is being performed. The pads are held in position by means of screws 90 entered into counter sunk bores in the pads and screwed into the undersides of the bars 82. When the bars are pressed downwardly under adequate force, the pads are compressed and spread out to engage the guide rail as described, also overhanging the edges thereof as shown in Figure 8 to directly grip the solder bars.

Immediately adjacent and to the outside of the pads are disposed centering blocks 91—91 (Figures 4, 8 and 9). These centering blocks have their undersides contoured to fit the upper curved surfaces of the adjacent solder bars. As shown, a central groove is provided indicated at 92 and arcuate grooves 93 are provided at either side thereof for bearing against the bars at either side of the one being centered.

Figure 10:
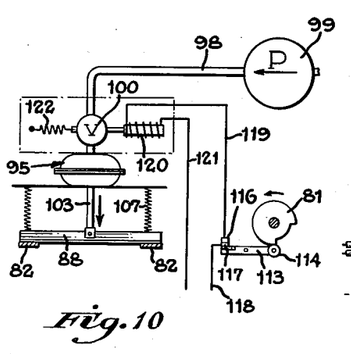
Figure 10 is a diagrammatic view illustrating the air and electric circuits for controlling and operating the clamping and centering means.

The operating mechanism for this centering and gripping mechanism consists of an air pressure operated device generally indicated at 95. This device comprises a casing member 96 made up of upper and lower halves including flanges 97 secured together. A diaphragm, not shown, is secured between the flanges and divides the casing to provide an upper air pressure chamber to which air is admitted through conduit 98. The air is delivered under pressure from a pump 99 through this conduit 98 and its admission to the chamber of the pneumatic device is controlled by a valve 100 (Figure 10). The plunger 101 (Figure 4) is attached to the diaphragm and is vertically and axially movable when the air is admitted to the chamber and the diaphragm displaced.

The pneumatic device is secured to the top flange of an angle iron rail 102 disposed between the bearing standards 43—43 and welded thereto. An appropriate guide bore is provided through the bottom of the pneumatic device and through the rail 102 for slidably mounting the plunger 101. The lower end of the plunger is of reduced diameter as at 103 and has a yoke member 104 screwthreaded thereon. The yoke is bifurcated and its arms straddle and are attached to the vertical flange of the rail 88 connecting the clamping bars 82. A pin 106 pivotally connects the arms of the yoke to the center of the bar 88.

The centering and gripping device is urged upwardly under constant spring pressure by means of coil springs 107—107 having their upper ends fixed to pins 108 welded to the cross rail 102 and having their lower ends attached to the rear ends of the bars 82 by means of ring bolts 109. These springs are under constant tension tending to return the centering and gripping device to its upper position where it will be ineffective for gripping or centering the solder bars. When the air is admitted to the chamber of the pneumatic device, the plunger is moved downwardly under considerable force and the gripping and centering action previously described ensues. The amount of pressure applied, that is, the amount of downward movement of the device is limited by means of an abutment screw 110 screwthreaded into a vertical post 111 mounted on the plate 42. A lock nut 112 holds the abutment screw in fixed adjusted position.

Figure 11:
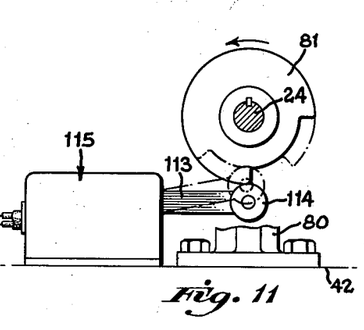
Figure 11 is a sectional view taken on line 11—11, Figure 1, detailing the cam and switch for operating the air valve for the clamping and centering means.

The air valve is operated at the appropriate time, in connection with the operation of the tools, by means of the cam 81 previously referred to. This cam operates a switch arm 113 (Figures 10 and 11). The switch arm includes a roller 114 engaged by the cam surface for swinging the switch arm and for making and breaking the contact. The switch is generally indicated at 115 and includes contacts 116 and 117, one of which is on the movable arm. An electrical lead 118 extends to the contact 117 and the circuit is established through the contacts to another lead 119 extending from the contact 116. The circuit is thus established to a solenoid 120, the other side of the circuit consisting of the lead 121. The solenoid is mechanically connected to the valve generally indicated at 100. The valve may be spring returned through a spring diagrammatically shown at 122.

Thus it will be apparent that at the proper time in the rotation of the shaft in relation to its other functions, that is, the indexing of the work holder and the translating of the tools, the centering and gripping device will be operated to firmly hold the bar being worked upon in position against lateral and axial displacement.

The tool driving units generally indicated at 21 and 22 are of duplicate construction but in order to achieve the proper positioning and operation of the tools, one of the units is inverted. In other words, the units are interchangeable merely by the simple process of turning them around. These units are mounted on large stationary bearing shafts 125. These bearing shafts are firmly fixed between the bearing standards 43 and additional outwardly disposed standards 126 (Figure 1). The units are adjustable longitudinally of these shafts so that the operator may set the units at the proper distance from the work, that is, the work carrier.

Figure 6:
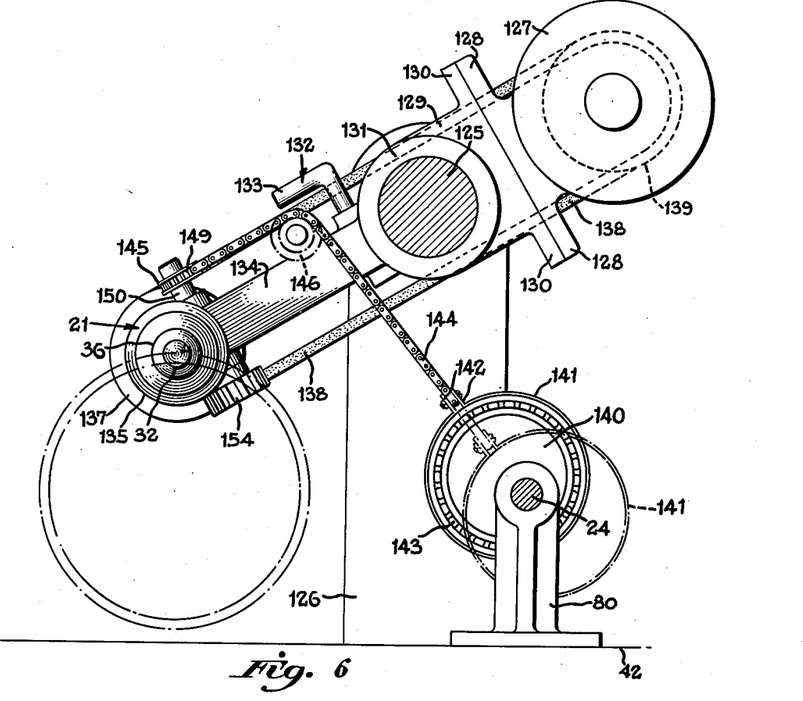
Figure 6 is a sectional view taken on line 6—6, Figure 1, illustrating one of the tool holder and driving units for forming one end of the solder bar.
Figure 7:
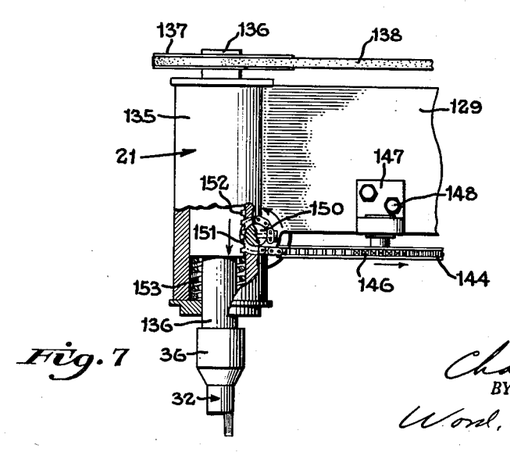
Figure 7 is a fragmentary top plan view of the unit shown in Figure 6 illustrating the mechaism for translating the tool holding spindle thereof.

Since these units are duplicates with the exception of the tools used, they will be described in the singular. An electric motor 127 is provided, this motor being fixed by means of a foot structure 128 to the body 129 of the unit, flanges 130 being provided on the body for cooperation with the feet of the motor (Figure 6). The body 129 includes a bore 131 traversed by the support shaft 125. Associated with the body adjacent the bore is a clamping device generally shown at 132. The details of this clamping device are not disclosed, the handle portion 133 thereof appearing in Figure 6. Thus, the operator may set the unit in any position of longitudinal and rotative adjustment desired. The unit may be swung on the support shaft to bring the axis of the tool into alignment with the solder bar to be machined and is then fixed in this position for subsequent operation.

The body 129 includes a forward extension 134 and this extension has, as an integral part thereof, a bearing 135 for the tool driving spindle. This bearing 135 has its axis disposed parallel with the shaft 125 and with the axes of the tools as brought up for machining. A spindle shaft 136 is driven by means of a pulley 137 fixed thereto and driven by means of a belt 138 extended from the motor pulley 139. The internal details of the body and spindle support are not shown since they are not material to the present invention, any conventional bearing arrangement being useable. As previously described, the end of this shaft includes a chuck 38 within which the tool or tool holder is fitted.

Translation of the tool spindle is accomplished by means of an eccentric 140 fixed to the shaft 24 (Figure 6). This eccentric operates within a circular yoke 141 consisting of a strap of metal encircling the eccentric and including a split portion providing spaced flanges 142. A ball bearing 143 is provided between the eccentric and the yoke. A sprocket chain 144 is attached to one end between the flanges 142 and extends to and is attached relative to a pulley 145 adjacent the spindle. A sprocket gear 146 is journalled in a bearing bracket 147 fixed to the body 129 by means of screws 148. This sprocket gear guides the chain 144 and directs it along the frame so as to properly engage the pulley 145 (Figure 6). Adjacent the pulley 145, the links of the chain are set at a different angle from the balance of the chain so as to properly engage within the groove of the pulley 145 as indicated at 149. The pulley 145 is fixed to a shaft 150, the shaft being journalled in the spindle bearing alongside the spindle. Within the spindle bearing a rack gear 151 is fixed to the shaft and engages the rack teeth 152 of a translatable member of the spindle assembly. Thus operation of the eccentric through this mechanism will cause translation of the tool spindle at the proper time so as to achieve feeding of the tool into the work. Appropriate means, such as a spring 153, is provided for withdrawing the tool from the work prior to the indexing movement of the work holder. The shaft 150 includes a manipulating knob 154 on the end thereof opposite to the end carrying the translating pulley.

The sequence of movements of the various elements are as follows. Assuming the machine to be in the position shown in Figure 4, the centering and gripping mechanism has just been operated and is in effective position for centering and gripping a solder bar to be machined. At this time the tool spindles are drawn back and are in position for the machining of the ends of the bar. As operation continues, the spindles move in and the male and female ends of the bar are formed, the spindles being constantly driven by their respective motors. After the tools have been withdrawn, the centering and gripping device operates to release the work and the indexing mechanism is thereupon effective for advancing the work holder a distance between work centers to bring up the next solder bar. As soon as the work has been indexed, the centering and gripping device is then actuated by its cam and the next bar is properly centered and gripped to again begin the cycle.

Having described my invention, I claim:

1. In a machine for forming the ends of solder bars, a pair of spaced wheels having aligned bar receiving grooves in their peripheries, means for feeding the bars to said grooves, a guide rail formed of relatively thin flexible material for maintaining the bars in the grooves throughout a portion of the rotation of the wheels, means for indexing the wheels a distance equal to that between the centers of the grooves, a clamping and centering device for clamping the wheels between indexing movements and for centering successive bars for forming operations thereon, the said clamping and centering device including an equalizing bar, actuating means connecting the opposite ends of the equalizing bar to an intermediate portion of the flexible guide rail, and an actuating device connected to the intermediate portion of the equalizing bar adapted to force the bar and guide rails into clamping engagement against the solder bars.

2. In a machine for forming the ends of solder bars, a pair of spaced wheels having aligned bar receiving grooves in their peripheries, means for feeding the bars to said grooves, a guide rail for maintaining the bars in the grooves throughout a portion of the rotation of the wheels, means for indexing the wheels a distance equal to that between centers of the grooves, a clamping and centering device for clamping the wheels between indexing movements and for centering successive bars for forming operations thereon, tool driving mechanisms adjacent the respective ends of the centered bars and including tools for forming a cavity in one end of each bar and a stud on the other end of the bar, said mechanisms being adjustably mounted and including driving means, means for translating the tools in the proper synchronism with the indexing, clamping and centering of the solder bars, and electrically controlled, pneumatically operated means for the clamping and centering device operated in synchronism so as to effectively grip and center successive bars in axial alignment with the tools for the aforesaid operations the said pneumatically operating means including a rocking bar connected thereto intermediate its length, means connecting the opposite ends of the rocking bar with the clamping and centering device of the respective wheels and adapted to apply balanced pressure engagement against the opposite ends of the solder bars.

3. In a machine for forming a tapered bore and a correspondingly tapered stud in the opposite ends of solder bars, a pair of spaced wheels having aligned bar receiving grooves in their respective peripheries, a ratchet wheel mounted upon the axis of rotation of the wheels for advancing the wheels, a pawl engageable with the ratchet wheel and adapted to advance the wheels and solder bars intermittently, an eccentric connected to the said pawl for reciprocating the same, a pair of flexible arcuate guide rails extending partially around the respective wheels in spaced relationship thereto to confine the bars, a clamping bar having its opposite ends secured to the said arcuate rails and adapted to clamp the solder bar between the rails and grooves, respective forming tools mounted adjacent the respective wheels, means for actuating the clamping bar in timed relationship with the intermittent advancement of the wheels, a centering block secured to the respective opposite ends of the clamping bar, the centering blocks each having a recess engageable with a soldering bar and arranged to engage and center the bar relative to the forming tools, and means for translating the said tools longitudinally with respect to the solder bars in timed relationship with the advancement of the wheels to provide automatic forming of the opposite end of the bars in timed relationship with the intermittent advancement of the wheels.

4. In a machine for machining the opposite ends of solder bars, a pair of spaced wheels having aligned bar receiving grooves in their peripheries, an inclined feed hopper extending outwardly from the wheel having its inner edge adjacent the periphery of the wheels to feed the solder bars by gravity from the hopper to the said grooves, means for advancing intermittently the said wheels a distance equal to centers of the grooves in a direction to carry the solder bars upwardly from the inner edge of the hopper, a respective arcuate guide rail extending around the periphery of each wheel having its leading edge disposed above the edge of the hopper and adapted to confine the solder bars between the surface of the guide rail and said grooves, the said guide rail being formed of thin flexible material and including a horizontal portion extending forwardly of the wheel beneath the said hopper to provide a bar discharge portion, a pair of forming tools disposed at opposite sides of the wheels engageable with the respective ends of the solder bars, clamping means arranged intermittently to deflect the guide rails toward the wheels for clamping the solder bar between the guide rail and wheels adjacent the forming tools, and timed means for translating the forming tools relative to the ends of the solder bars to machine the opposite ends of the bars.

5. In a machine for machining the ends of solder bars, a pair of spaced wheels having respectively aligned bar receiving grooves in their peripheries, an inclined guideway arranged to feed the solder bars by gravity to the feed grooves, an arcuate guide rail formed of relatively thin flexible material extending partially around the periphery of the wheels, means for indexing the wheel intermittently in a direction to feed the solder bars from the inclined hopper to a position interposed between the grooves and arcuate rails, a pair of clamping levers pivotally mounted above the said guide rails, an equalizing bar having its opposite ends connected to the swinging ends of the clamping levers, an actuating device connected substantially at the center of the equalizing bar adapted to raise and lower the bar and levers intermittently with respect to the wheels in time with the advancement of the wheel, a centering block secured to each of said levers intermediate their length and adapted to engage and center the solder bars successively, connecting means between the respective levers and flexible guide rails for pressing the rails against the solder bars when the bar is engaged by the centering blocks, forming tools located adjacent the opposite sides of the wheels adapted to machine the ends of the clamped solder bars successively, and means for translating the tools with respect to the solder bars in timed relationship with the clamping of the bars relative to the wheels.

CHARLES E. BURKE.

REFERENCES CITED

The following references are of record in the file of this patent:

UNITED STATES PATENTS

| Number | Name | Date |
|---|---|---|
| 5,228 | Warth | Jan. 7, 1873 |
| 666,905 | Packer | June 29, 1901 |
| 1,972,293 | Ellison | Sept. 4, 1934 |
| 2,024,445 | Galehouse | Dec. 17, 1935 |
| 2,364,884 | Weimer | Dec. 12, 1944 |